2,952,781

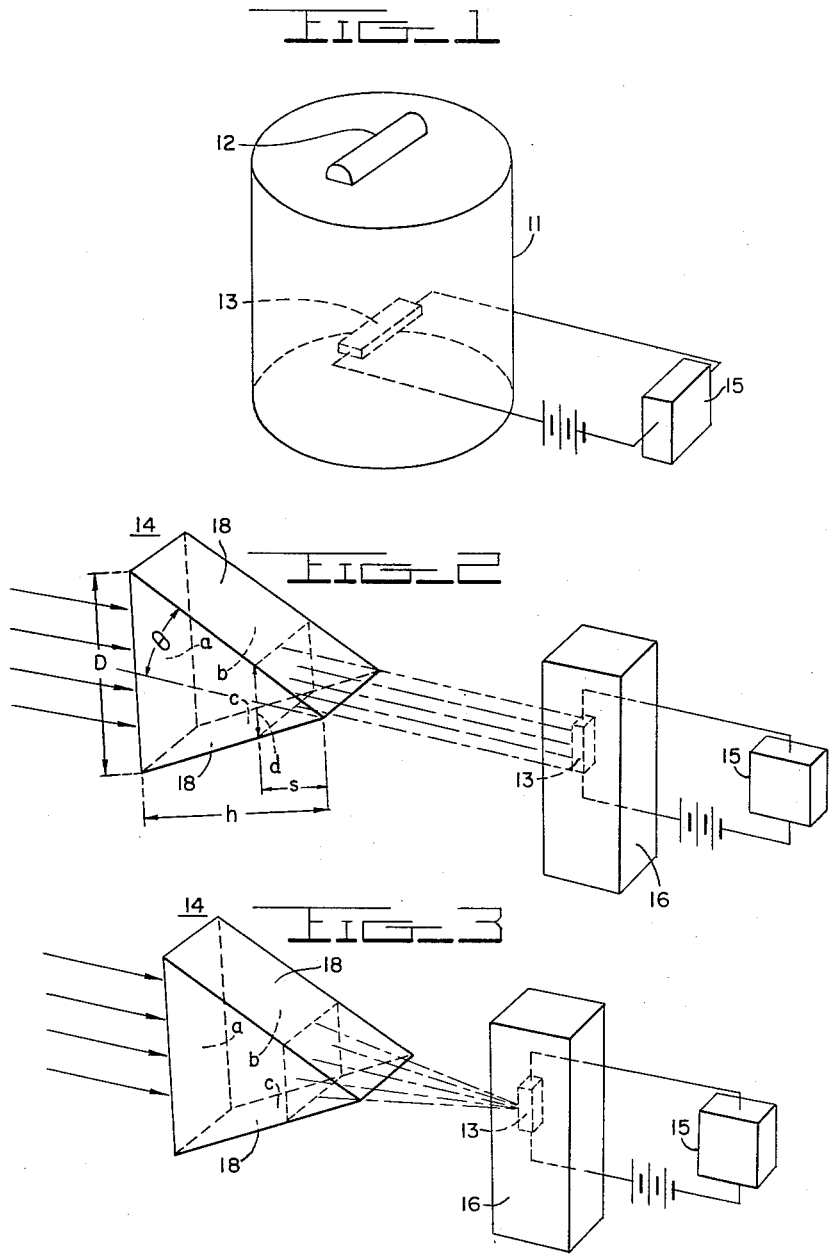

PHOTODETECTOR SYSTEM

Sidney H. Hersh, % Naval Research Laboratory,
Washington 25, D.C.

Filed Oct. 11, 1955, Ser. No. 539,956

2 Claims. (Cl. 250—216)

(Granted under Title 35, U.S. Code (1952), sec. 266)

The invention described herein may be manufactured and used by or for the Government of the United States of America for governmental purposes without the payment of any royalties thereon or therefor.

The present invention relates to photodetectors employing a light sensitive semiconductor in combination with an optical system for efficiently directing the desired incident radiation onto the detector element. For physical protection, such elements are preferably encased or potted in transparent plastic.

It is an object of the invention to provide a photodetector having enhanced sensitivity to a desired frequency band of incident wavelengths.

Another object of the present invention is to provide a potted photodetector including a unitary optical system.

Photodetectors of the present invention employ chromatic optical systems in distinction to the more expensive color correcting or achromatic types. Incident frequency discrimination is effected by positioning the detector element with respect to the optical system whereby maximum response is effected in a desired spectrum region while other frequency bands are rendered relatively ineffective. The photosensitive area of the detector element receives primarily radiation of the desired band only, and for this purpose, detectors described in my copending application Serial No. 530,916, now Patent No. 2,861,160, for Photodetectors are of special application in that they present sensitivity along a crystal interface which may be positioned very accurately with respect to certain chromatic optical systems of the present invention.

The invention will be further described in connection with the accompanying drawings in which:

Fig. 1 shows a photodetector system including a photosensitive element potted in a plastic forming a unitary chromatic optical system, Fig. 2 illustrates a photodetector using a chromatic collimating prismatic lens optical system, the separation of the elements being reduced for illustration, and Fig. 3 shows a photodetector using a chromatic focusing prismatic lens optical system.

Referring now to Fig. 1 there is illustrated a plastic cylindrical element 11 with a semi-cylindrical lens 12 molded on the top portion thereof and a photosensitive crystal 13 potted or molded within the cylindrical element. The crystal is placed just above the focal point of the desired light wavelength band to be detected so that maximum light intensity will be incident upon the crystal. Instead of a semi-cylindrical lens, a semi-spherical lens may be used. The focal point of the semi-cylindrical element for the wavelength of the spectrum portion being detected or that which strikes the crystal is determined by the equation.

$$F_2 = \frac{N_2 R_1}{N_2 - N_1}$$

where $N_1$ is the refractive index of air, $R_1$ is the radius of curvature of the cylindrical lens and $N_2$ is the refractive index of the lens at the frequencies concerned, usually taken at the center frequency.

Concentrated light of all wavelengths is incident on the semi-cylindrical lens 12 and on passing through the lens and into the cylindrical element 11 the light is refracted so that different wavelengths will come to a focus at different positions on the axis of the cylindrical element. Since the light activated crystal 13 is positioned in the cylindrical element 11 approximately at the focal point of the wavelength to be detected according to the abovementioned formula the desired wavelength will strike the crystal and excite electrons in the crystal causing a current to flow. An applied voltage source and an indicator 15 is connected in series with the crystal wherein the indicator 15 will indicate the current flow and it will also indicate the intensity of the light according to the reading of the indicator. The wavelengths shorter than the desired wavelength to be detected will have a focal point on the axis of the cylindrical element above the crystal and the wavelengths longer than the desired wavelength will come to a focus on the axis of the cylindrical element below the desired wavelength to be detected. The frequency response of the detector is thus enhanced to the desired band.

Fig. 2 illustrates a transparent prismatic lens 14 in combination with a potted photosensitive crystal 13 to form an optical system for photodetectors. The prismatic lens 14 is preferably formed from a plastic having a specific index of refraction and a specific apex angle so that a particular light wavelength will emerge from the apex end of the prismatic lens as parallel rays. The formula for determining the angle $\theta$ formed by one side and the axis of the lens for the wavelength emerging from the apex end as parallel rays is $$N\lambda = \frac{\cos\theta}{\cos 3\theta}$$

where N is the index of refraction of the prismatic lens for the particular desired wavelength ($\lambda$). The prismatic lens is formed with bases $a$, $b$ and $c$ wherein base $a$ is opposite the apex end and $b$ and $c$ are sides silvered at 18 to within a specific distance $s$ of the apex so that normal light rays incident on base $a$ will pass through the prismatic lens 14 by being reflected by the silvered sides $b$ and $c$ to emerge under refraction from the apex portion end of the lens 14. Light enters the lens 14 normal to base $a$ and undergoes an internal total reflection on one side of the prism and is refracted on exit at the other side. According to the index of refraction of the plastic and the angle of the apex of the lens, the desired wavelength may be refracted parallel to the axis of the lens, those light rays having shorter wavelengths than the desired wavelength will emerge from the apex portion and come to a focus according to Snell's law and those wavelengths having longer wavelengths will diverge away from the crystal. The desired wavelength that emerges from the apex portion of the lens strikes light activated crystal 13 exciting the electrons therein causing a current to flow, the amount of current flowing depends upon the intensity of the light wavelengths incident on the crystal. An applied voltage source and an indicator 15 is connected in series with the crystal wherein the indicator 15 is connected to the crystal in order to indicate a reading corresponding to the current flow through the crystal and the light intensity on the crystal.

The following formulas are used to determine the correct ratios of the prismatic lens in respect to the angle $\theta$ formed by one side and the axis, the height $h$, of the prism, the silvered faces, and the length S which is the length of clear plastic at the apex end from the apex to the silvered portion on the faces $b$ and $c$.

The formula for determining the angle $\theta$ is $$N\lambda = \frac{\cos\theta}{\cos 3\theta}$$

as given above. After finding the angle $\theta$ for the desired wavelength the other values can be determined. The height $h$ can be found by the formula $$h \tan \theta = \frac{D}{2}$$

where $D$ is chosen length for the side $a$ opposite the apex in accordance with the angle $\theta$.

An important feature in using the prismatic lens for producing parallel rays of desired wavelength is the distance $d$ across the lens at the point where the clear apex end begins and the silvered sides end. The distance $d$ across the lens at the clear end is found by the formula $$\frac{d}{D} = \frac{\sin \theta}{\sin 3\theta}$$

and the length, $S$, of the clear apex end of the lens is $$\frac{D}{h} = \frac{d}{S}$$

These formulas can be used for any optical material when the index of refraction for the desired wavelength is known.

In a specific prism for collimating green light, the base $D$ was one inch, the height $h$ 1.616 inches, the apex angle 34.4 degrees ($\theta = 17.20$), and the unsilvered apex portion of length $S$ was .610 inch. With this prism the photosensitive element, positioned on the axis distance where the other radiation is widely diffracted (on exit or beyond focus), would respond very predominately to green.

The reflective coating 18 may be omitted where the crystal design effects total reflection at the first incidence of radiation on the inclined faces which preferably takes place also in the uncoated length $S$. For practical use, the reflective coating insures operation under misalignment, since total reflection requires fairly precise angular incidence.

The crystal 13 is potted in a flat faced rectangular shaped element 16 having the same characteristics as the prismatic lens. The crystal is positioned near the surface of the element 16 so that refraction of the incident wavelength will be negligible and all of the light entering the plastic element 16 will be incident on the crystal.

Figure 3 shows a system using the light intensifying prism for enhanced response to two wavebands, which may be selected from an incident spectrum or may be matched to line emissions of a particular source. The prism 14 is designed to collimate the longer waveband and the photosensitive detector 13 is positioned at the focus of the shorter waveband, on axis to intercept simultaneously the collimated frequencies.

An optical medium for the present invention may be made by potting cadmium sulphide crystals in a particular optically clear plastic, the same as the plastic of which the cylindrical lens 12 and the prismatic lens 13 are made. The plastic has a specific index of refraction of 1.5389 for green light and is made according to the following process. 16 milliliters of Paraplex "P—43," an unsaturated polyester dissolved in monomeric styrene (mfgd. by the Rohm & Haas Co.) is mixed with 9 drops of accelerator "E," Cobalt Naphthenate (mfgd. by Marco Chemical, Inc.), and 15 drops of "MC–1" paste catalyst, benzoyl peroxide (mfgd. by the Celanese Corp. of America). The components are poured into a tube, and the tube placed on a motor driven roller and rolled for 30 minutes. The mixture is then poured into the desired mold containing the crystal to be potted and left to harden at room temperature and atmospheric pressure. The mixture sets in approximately 8 hours with the above proportions and becomes an optically clear plastic without any undue shrinkage.

Important features of this plastic are that it has little shrinkage, it sets at room temperature and atmospheric pressure, it has a high index of refraction and is optically clear. Each of these features has a bearing on the optical quality of the plastic wherein the optical quality determines the amount of light transmission through the plastic and the efficiency of the crystal as a light detector.

This invention is not limited to a specific plastic material for a potting compound nor is it limited to the specific crystal as a detector since it will be obvious to those skilled in the art that other plastics and light activated crystals can be used in view of the present disclosure. It is therefore to be understood, that within the scope of the appended claims, the invention may be practiced otherwise than as specifically described.

I claim:

1. A photodetector system comprising a radiation sensitive crystal, a radiation transparent prism of isosceles triangular section having a smooth surface base between inclined faces and positioned with its base orthogonal to the axis of incident radiation and apex end formed by said inclined faces of said prism proximate said crystal, said faces totally reflecting on first incidence radiation normally entering said base and refracting said radiation emerging from said faces near said apex end into converging, parallel, and diverging wavelengths respectively, said prism having a specific apex angle for collimating a particular frequency band of said incident radiation including $1/\lambda$ and has an apex angle $2\theta$ defined by $$N\lambda = \frac{\cos \theta}{\cos 3\theta}$$

where $N$ is the refractive index for $\lambda$, said radiation sensitive crystal being positioned relative to said apex end to receive said collimated frequency band.

2. A transparent prismatic lens adapted to collimate only a desired frequency band of incident radiation normal thereto and passing therethrough which comprises a radiation transparent material having a smooth surfaced base between inclined faces to provide an isosceles triangular section with said inclined faces at their interception forming an apex angle $2\theta$ defined by $$N\lambda = \frac{\cos \theta}{\cos 3\theta}$$

where $N$ is the index of refraction for $\lambda$, reflective means applied to each of said inclined faces extending from said base a distance greater than half but less than the total distance to the apex, said distance of uncoated inclined faces and said apex angle depending on the frequency of incident radiation to be collimated, said coated faces reflecting different radiation frequencies passing therethrough said lens and refracting said radiation wavelengths emerging through said uncoated face surfaces into converging, parallel and diverging wavelengths, respectively.

References Cited in the file of this patent

UNITED STATES PATENTS

| | | |
|---|---|---|
| 1,736,500 | Legg | Nov. 19, 1929 |
| 1,926,824 | Stogoff | Sept. 12, 1933 |
| 1,981,999 | French | Nov. 27, 1934 |
| 2,010,307 | Leishman | Aug. 6, 1935 |
| 2,073,773 | Andres | Mar. 16, 1937 |
| 2,075,094 | Chubb | Mar. 30, 1937 |
| 2,222,788 | Touceda et al. | Nov. 26, 1940 |
| 2,317,988 | Forssberg | May 4, 1943 |
| 2,423,254 | Rettinger | July 1, 1947 |
| 2,511,102 | Clouser | June 13, 1950 |
| 2,548,783 | Goldsmith | Apr. 10, 1951 |
| 2,586,609 | Burke | Feb. 19, 1952 |
| 2,587,589 | Bordewieck | Mar. 4, 1952 |
| 2,668,867 | Ekstein | Feb. 9, 1954 |
| 2,672,072 | Sachtleben et al. | Mar. 16, 1954 |
| 2,682,802 | Fedorchak et al. | July 6, 1954 |
| 2,706,253 | Hutchins et al. | Apr. 12, 1955 |
| 2,718,170 | Lyot | Sept. 20, 1955 |
| 2,881,654 | Toffolo | Apr. 14, 1959 |